May 20, 1969
M. L. PALMER
3,444,987
PORTABLE CONVEYOR STACKER
Filed March 22, 1967
Sheet 1 of 6
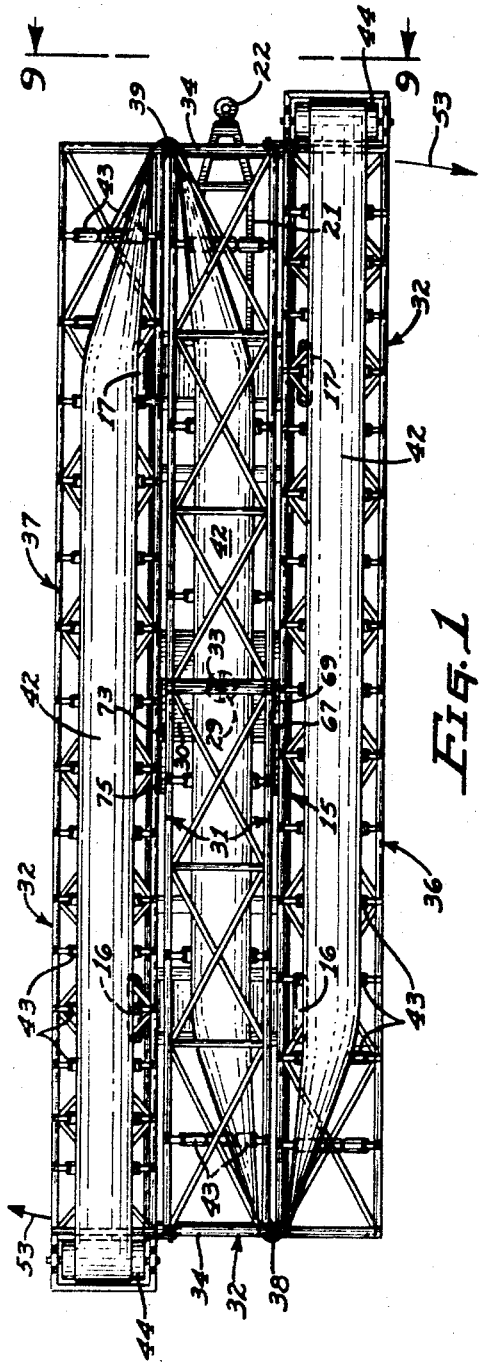
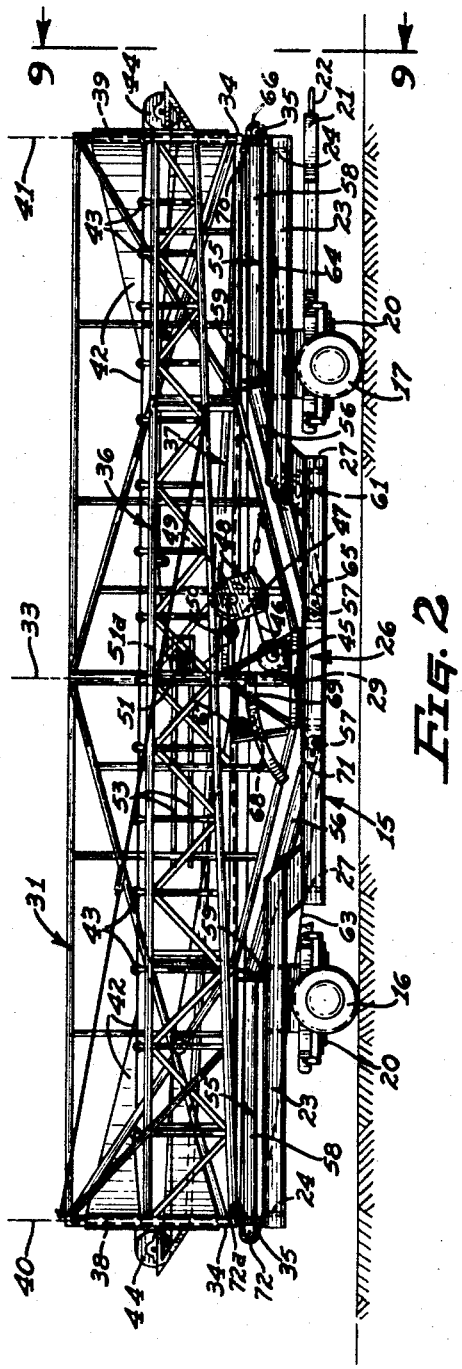
INVENTOR.
MARION L. PALMER.
BY
Willard S. Groen
ATTORNEY.

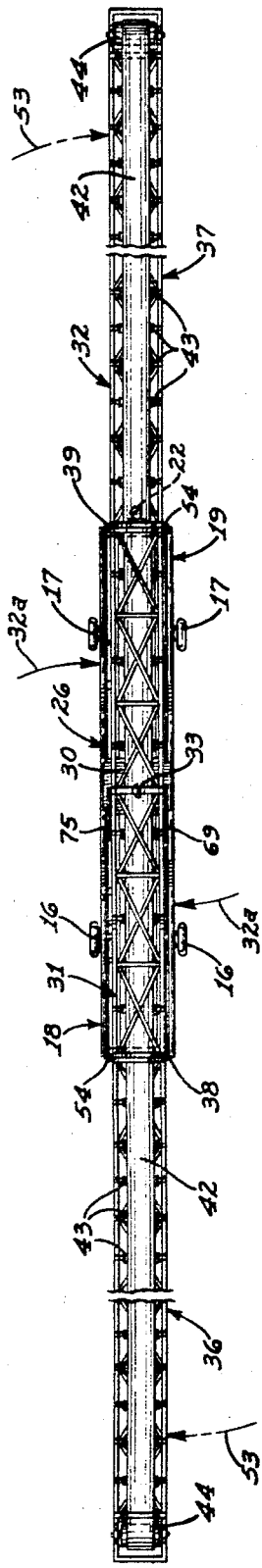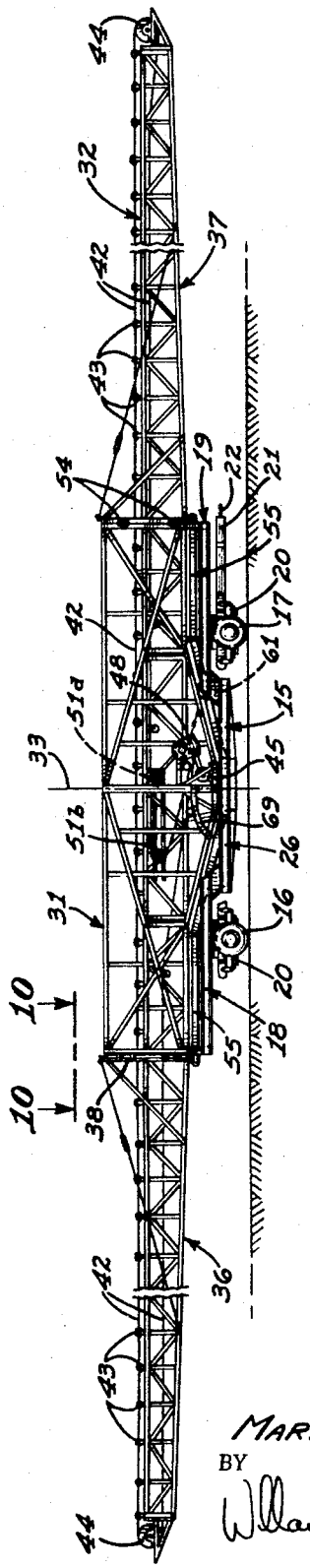

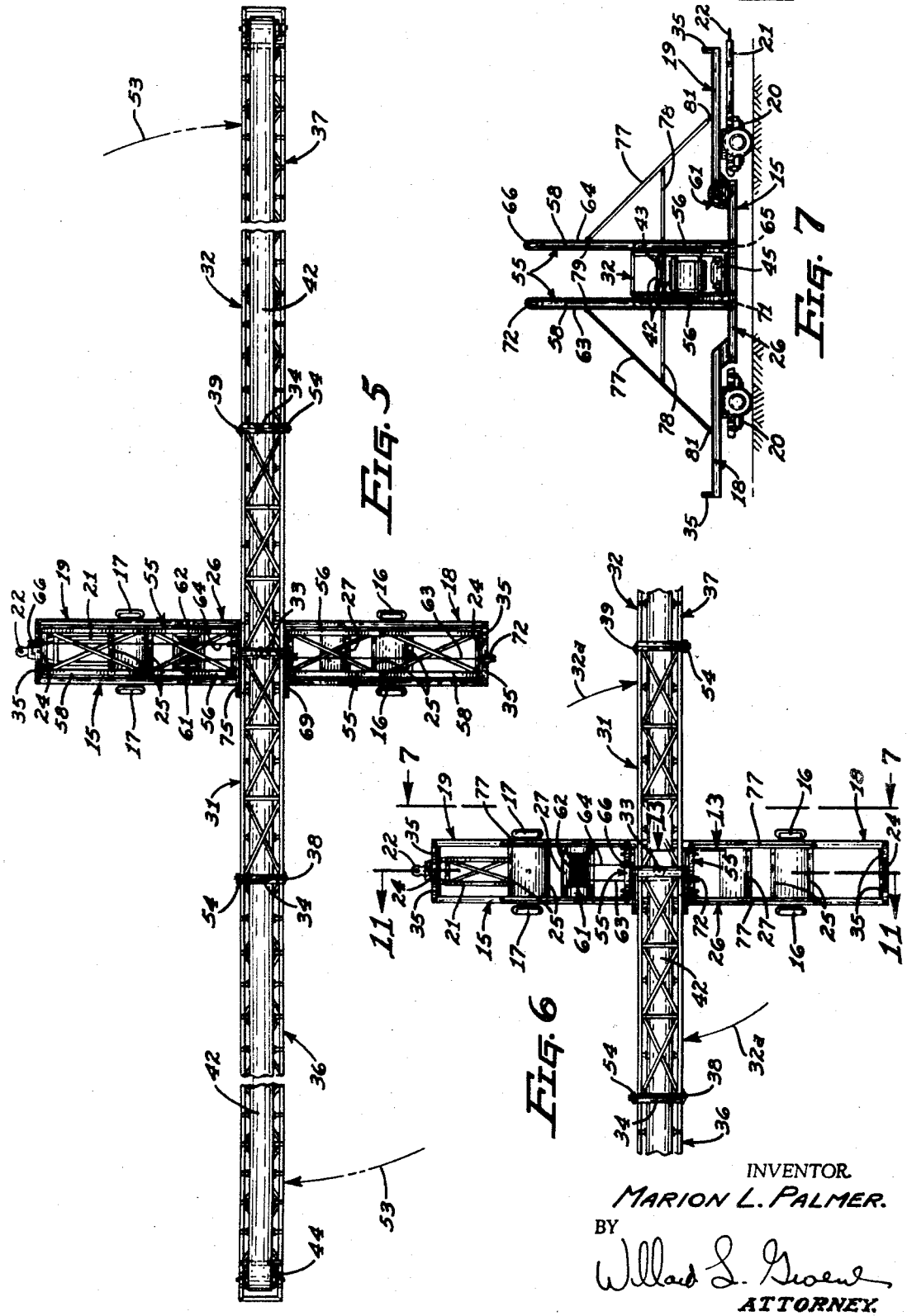

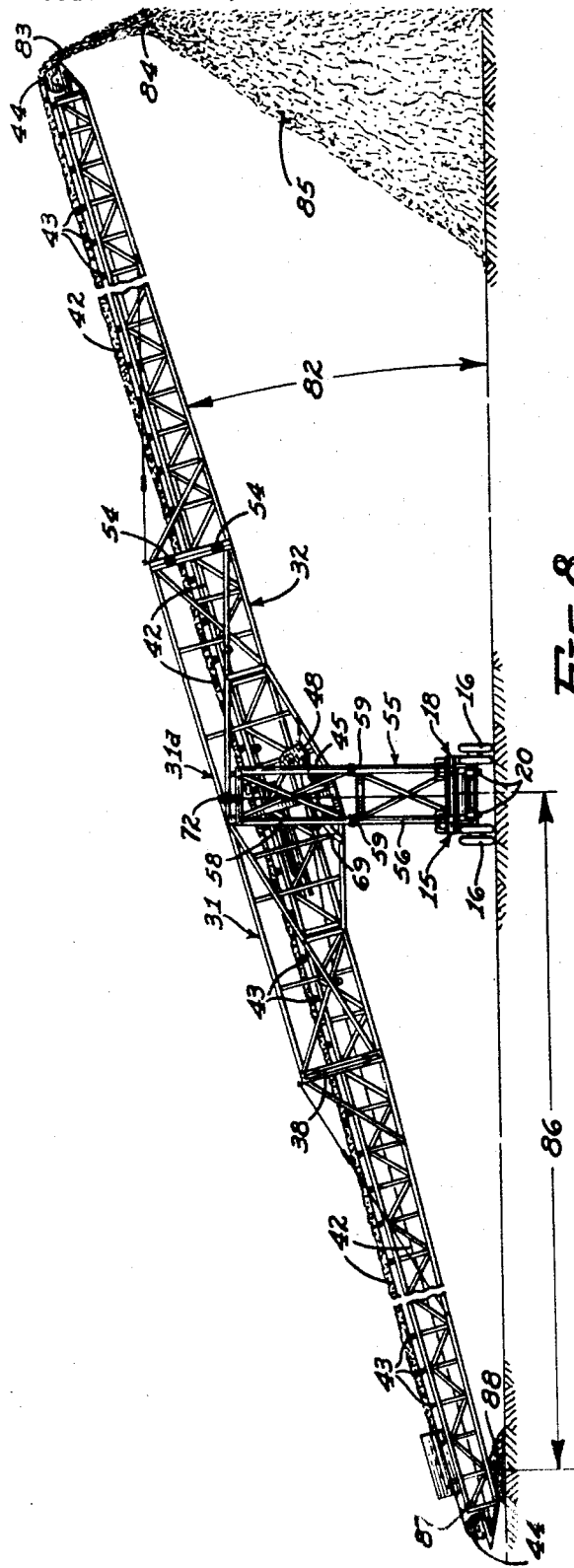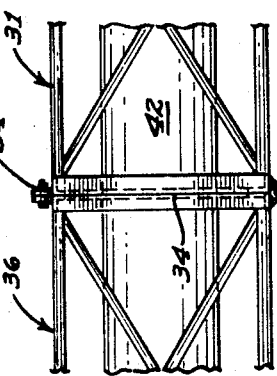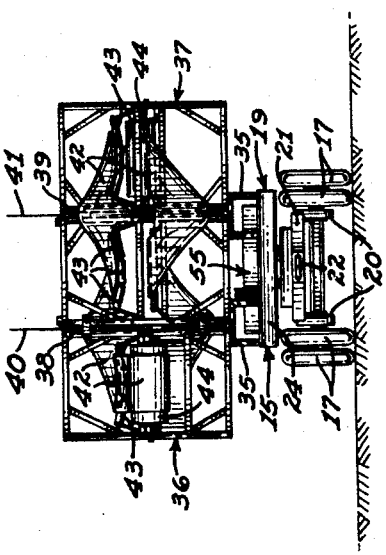

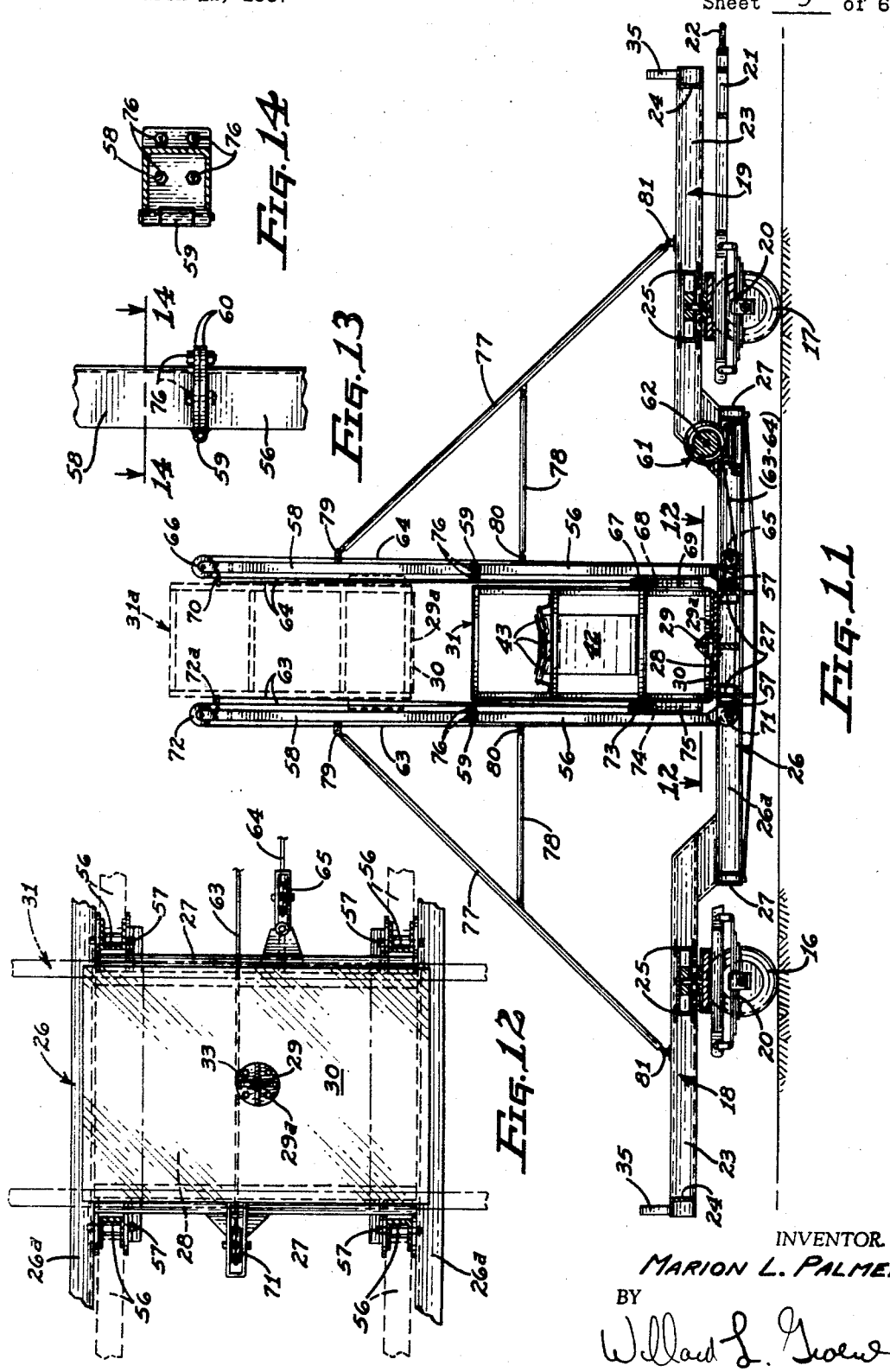

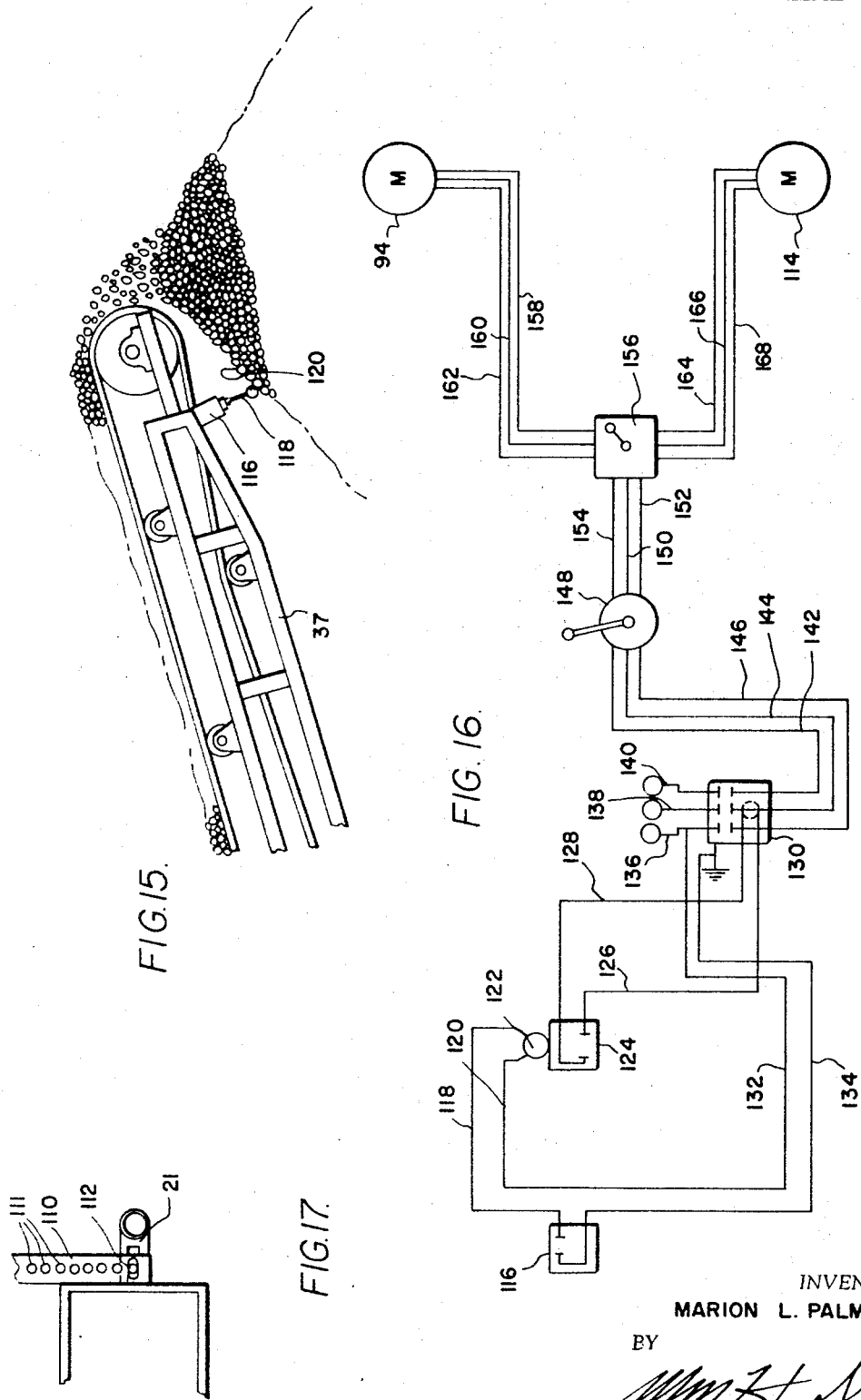

United States Patent Office 3,444,987
Patented May 20, 1969

3,444,987
PORTABLE CONVEYOR STACKER
Marion Leslie Palmer, 1506 W. Campbell,
Phoenix, Ariz. 85015
Filed Mar. 22, 1967, Ser. No. 625,115
Int. Cl. B65g 41/00, 37/00
U.S. Cl. 198—233
9 Claims

ABSTRACT OF THE DISCLOSURE

A portable conveyor having a vehicle mounting a central conveyor portion to pivot on a vertical axis thereon, and whereon said central conveyor portion may be moved vertically; and a pair of end conveyor portions pivotally connected to said central conveyor portion to be extended or protracted relative to said central conveyor portion, such that all of the conveyor portions may be foldably disposed relative to each other for transportation on said vehicle.

---

This invention pertains to portable conveying apparatus, and is particularly directed to a portable belt conveyor stacker.

One of the objects of this invention is to provide a portable and collapsible belt conveyor for stacking and lifting materials from one elevation to another.

Still another object of this invention is to provide a portable stacking device which may be folded up and moved along a highway, and which may be quickly set up and put into effective operation.

Still another object of this invention is to provide a portable belt conveyor system in which an elongated conveyor belt is collapsible and foldable for transportation down a road to the job, but which may be elevated from its mid-portion to the desired height for conveying materials from ground level to a high pile for stacking.

Still another object of this invention is to provide an improved foldable portable conveyor stacker, which has inherent control for elevating and lowering the conveyor boom during the feeding of material by the conveyor from one elevation to a higher elevation.

Still another object of this invention is to provide a portable conveyor stacker having a trailer vehicle upon which it is mounted, which vehicle plays a part in the moving of the conveyor for progressively stacking materials from ground level into a series of stacks or rows or circular arrangement of piles, as desired or required in the operation on the job.

Still another object of this invention is to provide a portable foldable conveyor stacker, which can be set up with a minimum of labor and skill upon the part of a user of the device, and which is highly stable, rigid and sturdy during operations in the field.

And an important object of this invention is to provide a self-sustaining truss having hinged outer end portions which fold back on its intermediate truss portion to substantially one-third its length, the hinged arrangement being such that no parts or elements of the truss need be taken apart or rearranged during folding and unfolding operations.

A further object of the invention is to provide novel control means comprising a switch actuator extending downwardly from the outer ends of the conveyor of the invention to be contacted by material piled up under the outer end of the conveyor, as material is stacked therefrom; said switch means coupled to power operated means for moving the outer end of the conveyor upwardly, as well as horizontally, and comprising time delay means which is adapted to continue the power operated movement of the conveyor vertically or horizontally for a period of time, whereby the conveyor may be moved laterally or vertically in substantial increments in accordance with the material in a stack, which piles up and contacts the switch means at the outer end of the conveyor.

Further features and advantages of this invention will appear from a detailed description of the drawings, in which:

FIG. 1 is a plan view showing the portable conveyor stacker in folded position for travel along a road to the job site;

FIG. 2 is a right hand side elevation of the apparatus shown in FIG. 1;

FIG. 3 is a plan view showing the conveyor in opened out extended position for use on the job;

FIG. 4 is a right hand side elevation of the arrangement shown in FIG. 3;

FIG. 5 is a plan view similar to FIG. 3 showing the boom rotated 90 degrees relative to the trailer;

FIG. 6 is a view similar to FIG. 5, but showing the supporting and manipulating booms of the trailer moved to operative position against the sides of the boom;

FIG. 7 is a view on the line 7—7 of FIG. 6;

FIG. 8 is a rear elevation of the apparatus shown in FIG. 6, but in final elevated position and in use on the job;

FIG. 9 is a front end view of the collapsed unit on the trailer indicated by the line 9—9 in FIGS. 1 and 2;

FIG. 10 is an enlarged fragmentary plan view of the hinge mechanism indicated by the line 10—10 of FIG. 4;

FIG. 11 is an enlarged fragmentary sectional view indicated by the line 11—11 in FIG. 6;

FIG. 12 is an enlarged sectional view on the line 12—12 of FIG. 11;

FIG. 13 is an enlarged fragmentary view on the line 13—13 of FIG. 6;

FIG. 14 is an enlarged sectional view on the line 14—14 of FIG. 13;

FIG. 15 is a fragmentary side elevational view of the outer ends of the conveyor of the invention, showing a switch means mounted on an outer end truss of the conveyor and having a feeler arm directed downwardly to be contacted by material delivered from the conveyor to a stack;

FIG. 16 is a diagrammatic view of the electrical wiring and power operated means of the invention as controlled by the switch means, shown in FIG. 15 of the drawings; and FIG. 17 is a fragmentary plan sectional view taken from the line 17—17 of FIG. 11.

As an example of one embodiment of this invention, there is shown a portable collapsible conveyor stacker comprising a trailer, indicated generally at 15 having suitable rear road wheels 16, and the front road wheels 17 for supporting the end portions 18 and 19 of the trailer chassis upon suspension systems 20. The front wheel suspension is preferably made steerable, and having a towing tongue 21 and hitch 22 attached thereto. The end portions 18 and 19 of the trailer chassis 15 comprises the side rails 23, the end transverse tie bars 24 and the intermediate transverse tie bars 25, which are supported on the suspension systems 20 of the road wheels 16 and 17. An intermediate depressed frame portion 26 having side rails 26a interconnects the inner ends of the side rails 23, and has suitable transverse tie bars 27. A swivel plate 28 having a fixed conical pivot and locating pin 29 is fixed to the intermediate portion of the depressed frame portion 26 to pivotally support the plate 30 fixed to the bottom of the intermediate truss portion 31 of the conveyor boom 32 for swinging about the vertical axis 33.

In FIGS. 1 and 2, the unit is shown collapsed and folded up for travel to a job site with the intermediate truss portion 31 swung about the vertical axis to a position parallel with the trailer frame chassis 15 with the outer ends 34 supported on the support brackets 35 fixed on the outer tie bars 24. The outer truss portions 36 and 37 of the boom 32 are respectively hinged at 38 and 39 to the outer ends of the intermediate truss portion 31 so that each truss 36 and 37 may be swung about the vertical axes 40 and 41 to positions along each side of the intermediate truss portion 31, when road traveling. A suitable endless conveyor belt 42 is supported on idler pulleys 43 carried by the truss portions 31, 36 and 37, and the belt is carried on end idler pulleys 44 journaled at the outer ends of the trusses 36 and 37. The belt 42 is driven by a suitable motor 45 mounted on the base plate 30 having a drive belt or chain connected to the input shaft 47 of a speed reducer 48 mounted on the intermediate truss portion 31, and having an output pulley 49 over which the belt 42 operates and is driven. The belt is further supported on an idler pulley 50 fixed on the truss 31 and passes over a belt tightening and slack release pulley 51, which is adjustably mounted to slide on guideways 53 on the truss 31 for maintaining proper belt tension, and for slackening up the belt when the unit is folded up, as best seen in FIG. 1, as the belt folds around the hinge portions 38 and 39, while still maintaining the belt in operating position in the truss sections 31, 36 and 37.

When the unit has arrived at the job site, the outer trusses 36 and 37 are swung outwardly in the directions indicated by the arrows 53, FIG. 1, so that the unit is fully extended, as shown in FIGS. 3 and 4. The belt tightener pulley 51 is moved from position 51a to position 51b, FIG. 4, putting the belt 42 in proper operating condition to be driven from the motor 45, clamping bolts 54, FIG. 10, being applied to mating flanges of the truss 31, and the trusses 36 and 37 to rigidly lock these members solidly and structurally together.

The thus extended boom 32 is then swung 90 degrees, arrows 32a, FIGS. 3 and 6, from a position parallel to the longitudinal extent of the trailer, as shown in FIG. 3, to the position shown in FIG. 5. A pair of gantrys 55 of H frame construction each comprises the lower columns 56 pivotally mounted on suitable pins 57 on the depressed intermediate portion 25 of the chassis frame, and the upper columns 58 pivotally connected by suitable hinges and bolting flanges 60. It is to be noted, FIG. 2, that the gantrys 55 fold down to a position on top of the chassis frame, but located below the folded up boom, when turned to position about the axis 33 over the chassis frame. A suitable power driven winch 61 has a cable drum 62 from which extends a pair of cables 63 and 64. The cable 64 extends under an idler pulley 65, then upwardly and over another idler pulley 66 atop a gantry, and then downwardly under a floating idler pulley 67 journaled in a pulley block 68 arranged to travel along an arcuate track 69 fixed on the intermediate boom truss 31, and then upwardly to deadhead at 70 on top of the gantry. The cable 63 for the other gantry leaves the winch drum 62 and passes under the idler pulley 71 journaled on the frame 25, then upwardly over the idler pulley 72 at the top of the gantry, then downwardly to a similar floating idler pulley 73 in a pulley block 74 arranged to travel along an arcuate track 75 fixed on the opposite side of the intermediate truss 31, and laterally aligned therewith, thence upwardly to deadhead at 72a.

When the winch 61 is operated to draw in the cables 63 and 64, and the boom is positioned, as shown in FIG. 5, the gantrys will be raised from the position, shown in FIGS. 2 and 5, to the position, shown in FIGS. 6, 7 and 11. When the gantrys are in vertical standing up position, FIGS. 11, 13 and 14, the bolting flanges 60 are secured together by suitable bolts 76, and the supporting struts 77 and 78 connected at 79 and 80 to the gantrys, and at 81 to the side rails 23 of the chassis frame holding the gantrys rigidly and securely at each side of the boom.

In order to regulate the slope 82 of the conveyor boom in relation to the height of the discharge end 83 relative to the top 84 of the pile of material 85 being stacked, the winch is operated so as to draw in the cables 63 and 64, which causes the intermediate portion 31 to be moved up to any desired raised position up to the top position 31a, while suspended on the gantrys 55, causing the base plate 30 to rise from the conical pivot pin 29. When returned downwardly, the conical pivot pin 29 again centers the base plate 30 on the swivel plate and chassis frame as the pivot pin 29 enters the hole 29a in the base plate 30. The face that the pulley blocks 68 and 74 can float along the arcuate tracks 69 and 75 allows a substantially constant distance 86 to be maintained between the trailer and the fixed ground level receiving end 87 of the conveyor boom. It is understood, that the winch may be automatically controlled in raising and lowering the boom in response to the height 84 of the pile 85, and that the trailer may be towed by its hitch tongue to swing the boom about a fixed ground pivot 88 so as to distribute the material in arcuate or circular arrangement of stacking or in circumferentially spaced piles of varying kinds of material about the ground level receiving end 87 of the stacker conveyor. The unit may be quickly and easily collapsed and folded for travel to another job by simply reversing the above recited steps for setting up the unit.

As shown in FIG. 11, the wheels 16 are mounted to support a steerable truck 90, which is pivotally mounted on the frame 18 about a vertical axle 92. Mounted on the truck 90 is a motor 94 having a gear box 96 provided with an output shaft 98 carrying a sprocket 100 engaged with a chain 102 which passes around a sprocket 104 in connection with the wheels 16 for driving the same.

The gear box 90 is provided with a clutch operating lever 106 operating a conventional clutch therein for declutching the sprocket 100 during transportation in which the wheels 16 are operated on the highway. The clutch 106 being operable to engage the sprocket 100 for driving the wheels by means of the motor 94, as will be hereinafter described in detail.

With reference to section line 17—17 on FIG. 11, and to the plan sectional view FIG. 17, it will be seen that the tongue 21 carries a plate 108 disposed below a plate 110 carried by the frame 23.

As shown in FIG. 17, the plate 110 is provided with a plurality of holes 111 through which a pin 112 may be disposed. The pin 112 extends downward through a hole in the plate 108 so that the tongue 21 may be fixed at various angles in accordance with the radial swing of the outer end of the conveyor of the invention. Likewise, plates 114 and 116 on the truck 90 and frame 23 may control the steering of the wheels 16. Thus, the wheels 16 and 17 may move about an arcuate path established in accordance with the movement of the conveyor about its normally lower end, as disclosed best in FIG. 8 of the drawings.

It will be obvious that the wheels 17 may be powered in a similar manner to the wheels 16 by motors, such as the motor 94. Accordingly, each of the wheels 16 and 17 may be powered by a motor 94, if desired.

As shown in FIG. 16, a motor 114 is provided as a power operated means for driving the winch 61.

The outer end truss 37, as shown in FIG. 15, carries a switch 116 having a downwardly directed arm 118 which extends below the delivery end of the conveyor of the invention. This arm 118 is disposed to be contacted by material 120 of a pile being built up below the outboard end of the conveyor. The actuating arm 118 for the switch 116, when deflected a certain distance, actuates the switch 116.

The switch 116, as shown in FIG. 16, is coupled by conductors 118 and 120 to a solenoid 122, which actuates a time delay switch 124. The time delay switch 124 is coupled by conductors 126 and 128 to a magnetic starter 130.

The switch 116 drives energy through conductors 132 and 134; the conductor 134 being coupled to ground, and the conductor 132 being coupled to a power input line 136.

The magnetic starter 130 is provided power through additional power input lines 138 and 140.

The magnet starter is provided with power output conductors 142, 144 and 146 connected to a reversing switch 148 having output conductors 150, 152 and 154, connected to a selector switch 156 having output conductors 158, 160 and 162 which are connected to the motor 94. Additionally, this electroswitch is provided with output conductors 164, 166 and 168, which are coupled to the motor 114.

In operation of the control system of the invention, the truss section 37 and the outboard end of the conveyor of the invention may be moved laterally or horizontally by energization of the motor 94 or several of these motors, as hereinbefore described. When the pile of material 120 builds up to a sufficient elevation to deflect the arm 118, the switch 116 is actuated, and it energizes the time delay switch 124, which energizes the magnetic starter 130 for a given period of time during which the motor 94 or a plurality of these motors continue to operate for moving the conveyor in a horizontal direction by energizing the wheels 16 and 17 and moving these wheels, together with the middle portion of the conveyor in a direction at substantially right angles to the axes of these wheels, it being noted, however, that these wheels are set to be steered around an arcuate path, as hereinbefore described, by the setting of the pins 112 in the respective plates 108 and 110, and plates 114 and 116 for holding the steerable wheels of the trailer in a certain arcuate path, as desired.

The selector switch 156, in this instance, is so disposed that the motors 94 are energized.

When it is desired to energize the motor 114 to raise the outboard end of the conveyor for a complete arcuate path over the stack 120, the selector switch 156 is operated to energize the motor 114, when the switch 116 is actuated, as hereinbefore described. The time delay switch 124 and the magnetic switch 130 also operate in the same manner, as hereinbefore described, with relation to the motor 94.

The reversing switch 148 may provide for reverse movement of the motors 94 and 114 for moving the outboard end of the conveyor back and forth in a horizontal direction, and for moving the central portion of the conveyor up and down by means of the motor 114.

It will be appreciated that the time delay switch 124 provides for incremental movement of the outboard end of the conveyor a sufficient distance so that the switch 116 need not be actuated very often. In accordance with the operation of this time delay switch, the outboard end of the conveyor is moved either vertically or horizontally a substantial distance in accordance with the width of the conveyor or in accordance with the elevation, which it is desired to raise the upper end of the stack of material.

While the apparatus herein disclosed and described constitutes a preferred form of the invention, it is also to be understood that the apparatus is capable of mechanical alternation without departing from the spirit of the invention, and that such mechanical ararngement and commercial adaptation as fall within the scope of the appendent claims are intended to be included herein.

Having thus fully set forth and described this invention, what is claimed and desired to be obtained by United States Letters Patent is:

1. A portable conveyor stacker comprising in combination:
   (A) a vehicle frame; ground contacting wheels supporting said frame,
   (B) a boom including an intermediate truss portion and a pair of outer end trusses hinged to the outer ends of said intermediate truss portion,
   (C) means on said frame for pivotally mounting the intermediate portion of said intermediate truss portion centrally of said frame for swinging about a vertical axis on said frame,
   (D) and further means on said frame arranged to raise and lower said intermediate truss portion of said boom relative to said frame; said means in item C for pivotally mounting the intermediate portion of said intermediate truss portion on said frame includes a swivel plate fixed on said frame, a conical pivot pin fixed centrally of said swivel plate, and a base plate fixed to said intermediate truss portion having a centrally positioned hole arranged to receive said conical pivot pin.

2. A portable conveyor stacker comprising in combination:
   (A) a vehicle frame; ground contacting wheels supporting said frame,
   (B) a boom including an intermediate truss portion and a pair of outer end trusses hinged to the outer ends of said intermediate truss portion,
   (C) means on said frame for pivotally mounting the intermediate portion of said intermediate truss portion centrally of said frame for swinging about a vertical axis on said frame,
   (D) and further means on said frame arranged to raise and lower said intermediate truss portion of said boom relative to said frame; said further means in item D includes a pair of collapsible gantrys movable to and from a collapsed substantially horizontal position on said frame to an upright position on said frame adjacent the sides of said intermediate truss portion, and having means interconnected between said gantrys and said intermediate truss portion operable to raise and lower said boom relative to said frame.

3. A portable conveyor stacker comprising in combination:
   (A) a vehicle frame; ground contacting wheels supporting said frame,
   (B) a boom including an intermediate truss portion and a pair of outer end trusses hinged to the outer ends of said intermediae truss portion,
   (C) means on said frame for pivotally mounting the intermediate portion of said intermediate truss portion centrally of said frame for swinging about a vertical axis on said frame,
   (D) and further means on said frame arranged to raise and lower said intermediate truss portion of said boom relative to said frame; said conveyor boom includes a conveyor belt, together with power means on said boom for driving said belt, and a belt tightener and slackener to allow said boom hinged outer end trusses to be folded against said intermediate truss portion and to be folded out of operative position while maintaining the conveyor belt in normal operative position.

4. A portable conveyor stacker comprising in combination:
   (A) a vehicle frame; ground contacting wheel supporting said frame,
   (B) a boom including an intermediate truss portion and a pair of outer end trusses hinged to the outer ends of said intermediate truss portion,
   (C) means on said frame for pivotally mounting the intermediate portion of said intermediate truss portion centrally of said frame for swinging about a vertical axis on said frame,
   (D) and further means on said frame arranged to raise and lower said intermediate truss portion of said boom relative to said frame; said further means in item D includes a floating element between said vehicle frame and said intermediate truss portion arranged to allow the tipping up of one end of said boom while the other end thereof is fixed at ground level relative to said frame.

5. A portable conveyor stacker comprising in combination:
   (A) a vehicle frame; ground contacting wheels supporting said frame,
   (B) a boom including an intermediate truss portion and a pair of outer end trusses hinged to the outer ends of said intermediate truss portion,
   (C) means on said frame for pivotally mounting the intermediate portion of said intermediate truss portion centrally of said frame for swinging about a vertical axis on said frame,
   (D) and further means on said frame arranged to raise and lower said intermediate truss portion of said boom relative to said frame; said further means in item D includes a pair of collapsible gantrys movable to and from a collapsed substantially horizontal position on said frame to an erected position adjacent the sides of said boom, when swung to a position at right angles to the length of said frame and means interconnected between said gantrys and said boom operable for both erecting said gantrys and raising and lowering said boom when said gantrys are in erected position.

6. A portable conveyor stacker comprising in combination:
   (A) a vehicle frame; ground contacting wheels supporting said frame,
   (B) a boom including an intermediate truss portion and a pair of outer end trusses hinged to the outer ends of said intermediate truss portion,
   (C) means on said frame for pivotally mounting the intermediate portion of said intermediate truss portion centrally of said frame for swinging about a vertical axis on said frame,
   (D) and further means on said frame arranged to raise and lower said intermediate truss portion of said boom relative to said frame; said conveyor boom includes a conveyor belt, together with power means on said boom for driving said belt, and a belt tightener and slackener to allow said boom hinged outer end trusses to be folded against said intermediate truss portion and to be folded out of operative position while maintaining the conveyor belt in normal operative position; first power operated means is disposed for driving at least one of said wheels; second power operated means disposed for moving said intermediate truss portion upwardly on said frame; switch means carried by one of said outer end trussess; said switch means having an actuating arm extending downwardly relative to said last mentioned outer end truss and disposed to be contacted by material, as said conveyor piles said material up under said last mentioned outer end truss; and third means coupled to said switch means alternately adapted to energize either said first or second power operated means for moving said last mentioned outer end truss horizontally or vertically.

7. A portable conveyor stacker comprising in combination:
   (A) a vehicle frame; ground contacting wheels supporting said frame,
   (B) a boom including an intermediate truss portion and a pair of outer end trusses hinged to the outer ends of said intermediate truss portion,
   (C) means on said frame for pivotally mounting the intermediate portion of said intermediate truss portion centrally of said frame for swinging about a vertical axis on said frame,
   (D) and further means on said frame arranged to raise and lower said intermediate truss portion of said boom relative to said frame; said conveyor boom includes a conveyor belt, together with power means on said boom for driving said belt, and a belt tightener and slackener to allow said boom hinged outer end trusses to be folded against said intermediate truss portion and to be folded out of operative position while maintaining the conveyor belt in normal operative position; first power operated means is disposed for driving at least one of said wheels; second power operated means disposed for moving said intermediate truss portion upwardly on said frame; switch means carried by one of said outer end trusses; said switch means having an actuating arm extending downwardly relative to said last mentioned outer end truss and disposed to be contacted by material, as said conveyor piles said material up under said last mentioned outer end truss; and third means coupled to said switch means alternately adapted to energize either said first or second power operated means for moving said last mentioned outer end truss horizontally or vertically; said third means comprises time delay means disposed to maintain energization of either of said first or second power operated means for a period of time.

8. A portable conveyor stacker comprising in combination:
   (A) a vehicle frame; ground contacting wheels supporting said frame,
   (B) a boom including an intermediate truss portion and a pair of outer end trusses hinged to the outer ends of said intermediate truss portion,
   (C) means on said frame for pivotally mounting the intermediate portion of said intermediate truss portion centrally of said frame for swinging about a vertical axis on said frame,
   (D) and further means on said frame arranged to raise and lower said intermediate truss portion of said boom relative to said frame; said conveyor boom includes a conveyor belt, together with power means on said boom for driving said belt, and a belt tightener and slackener to allow said boom hinged outer end trusses to be folded against said intermediate truss portion and to be folded out of operative position while maintaining the conveyor belt in normal operative position; first power operated means is disposed for driving at least one of said wheels; second power operated means disposed for moving said intermediate truss portion upwardly on said frame; switch means carried by one of said outer end trusses; said switch means having an actuating arm extending downwardly relative to said last mentioned outer end truss and disposed to be contacted by material, as said conveyor piles said material up under said last mentioned outer end truss; and third means coupled to said switch means alternately adapted to energize either said first or second power operated means for moving said last mentioned outer end truss horizontally or vertically; said third means comprises time delay means disposed to maintain energization of either of said first or second power operated means for a period of time; said third means also comprises a selector switch for alternately selecting energization of either of said first or second power operated means.

9. A portable conveyor stacker comprising in combination:
   (A) a vehicle frame; ground contacting wheels supporting said frame,
   (B) a boom including an intermediate truss portion and a pair of outer end trusses hinged to the outer ends of said intermediate truss portion,
   (C) means on said frame for pivotally mounting the intermediate portion of said intermediate truss portion centrally of said frame for swinging about a vertical axis on said frame,
   (D) and further means on said frame arranged to raise and lower said intermediate truss portion of said boom relative to said frame; said conveyor boom includes a conveyor belt, together with power means on said boom for driving said belt, and a belt tightener and slackener to allow said boom hinged outer end trusses to be folded against said intermediate truss portion and to be folded out of operative position while maintaining the conveyor belt in normal operative position; first power operated means is disposed for driving at least one of said wheels; second power operated means disposed for moving said intermediate truss portion upwardly on said frame; switch means carried by one of said outer end trusses; said switch means having an actuating arm extending downwardly relative to said last mentioned outer end truss and disposed to be contacted by material, as said conveyor piles said material up under said last mentioned outer end truss; and third means coupled to said switch means alternately adapted to energize either said first or second power operated means for moving said last mentioned outer end truss horizontally or vertically; said third means comprises time delay means disposed to maintain energization of either of said first or second power operated means for a period of time; said third means also comprises a selector switch for alternately selecting energization of either of said first or second power operated means; said third means also includes a reversing switch for selecting energization of said first and second power operated means in either of two directions.

References Cited

UNITED STATES PATENTS

| 1,031,850 | 7/1912 | Harpstrite | 198—113 |
| 1,512,382 | 10/1924 | Walsh | 198—119 |
| 3,181,686 | 5/1965 | Hurlburt | 198—87 |

RICHARD E. AEGERTER, *Primary Examiner.*

U.S. Cl. X.R.

198—113, 115